Jan. 18, 1949.  W. ECK  2,459,769
APPARATUS FOR TESTING PRESSURE GAUGES
Filed April 21, 1945
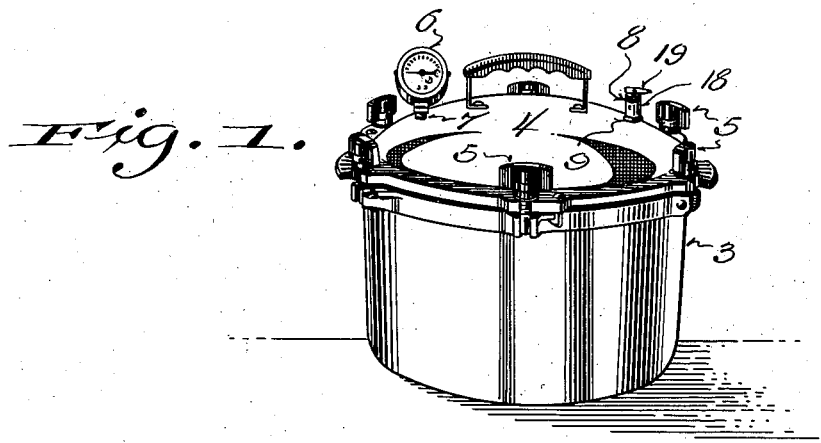
Fig. 1.
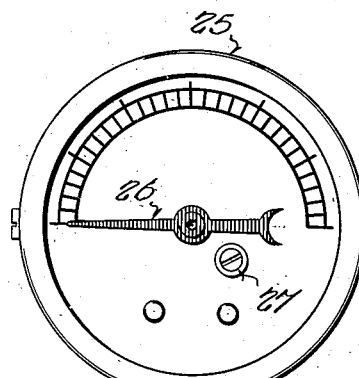
Fig. 2.
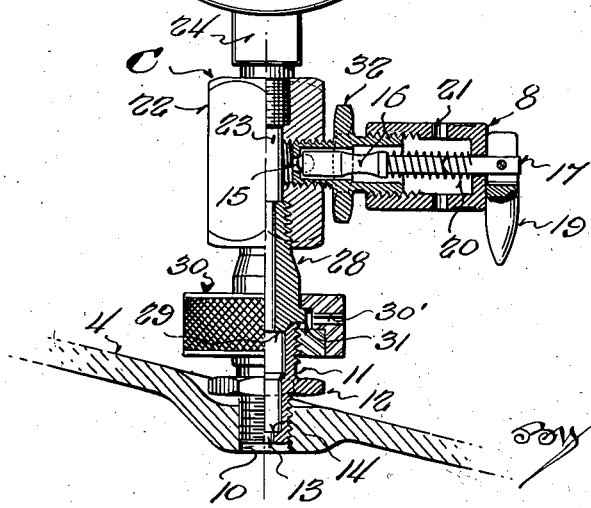
Inventor:
William Eck Patented Jan. 18, 1949

2,459,769

UNITED STATES PATENT OFFICE 2,459,769

APPARATUS FOR TESTING PRESSURE GAUGES

William Eck, Manitowoc, Wis., assignor to Wisconsin Aluminum Foundry Company, Manitowoc, Wis., a corporation of Wisconsin Application April 21, 1945, Serial No. 589,599

1 Claim. (Cl. 73—4)

This invention pertains to an apparatus for testing the accuracy of pressure indicating gauges, and more particularly those used on conventional domestic pressure cookers.

At the present time the covers of most conventional pressure cookers are equipped with a pressure indicating gauge, and a pressure control valve that is set to release pressure generated within the cooker at a predetermined amount.

Because the temperature developed within a pressure cooker is dependent upon the amount of steam pressure generated, it is essential that the pressure gauge be extremely accurate, inasmuch as a slight variation in the pressure results in a proportionately greater variation in temperature. For example, in a variation of pressure from zero to twenty pounds the temperature varies from atmosphere to approximately 260° Fahrenheit.

It will, therefore, be readily seen that any inaccuracy in the pressure gauge will be reflected in properly timing the cooking period for a desired temperature. This is important when it is realized that the cooking period for different foods must vary within an exceedingly limited range, and therefore, even a slight inaccuracy in the pressure gauge results in improper calculation of the cooking period.

Usually conventional pressure indicating gauges are threaded into the covers in domestic cookers, and while they are accurately set before leaving the factory, after a certain period of use the intricate parts are affected to the extent that the pressure reading becomes inaccurate.

Heretofore, in order to determine such inaccuracy in gauges from time to time, it has been necessary to remove the gauge and either return it to the factory, or connect the gauge to a testing apparatus attached to the opening in the cover from which the gauge is removed.

The above methods are objectionable for the reason that, in removing and replacing the gauge, frequently the connection is marred or damaged to the extent that it becomes insecure. This also occurs through carelessness and results in subsequent leakage. Naturally, return of the gauge to the factory necessitates an expense in shipping and testing, and also a considerable loss of time.

Therefore, the primary object of the present invention resides in the provision of a simple and fool-proof method and economic apparatus by which pressure cooker gauges can be effectively tested without removal or disturbance of any of the conventional equipment connections.

Incidental to the foregoing, a more specific object of the invention resides in the provision of a testing apparatus for attachment to the connector fitting of the present conventional pressure regulating valve.

A further object is to provide the foregoing testing apparatus with an adapter fitting for receiving the conventional pressure regulating valve removed from the connector fitting in order to permit attachment of the testing apparatus, thus allowing testing under actual cooking conditions, including the safety factor afforded by the regulating valve that relieves excessive pressure.

With the above and other objects in view, which will apear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

In the drawing:

Fig. 1 is a perspective view of a conventional domestic pressure cooker equipped with the usual pressure gauge and regulating valve; and Fig. 2 is a view, partially in elevation and partially in section, illustrating the testing apparatus in operative position on the cover of the cooker.

Referring now more particularly to the accompanying drawing the cooker illustrated in Fig. 1 consists of a receptacle 3, provided with a cover 4 which is sealed on the top of the receptacle during operation of the cooker by peripherally spaced clamps 5 of any conventional type.

The cover 4 is provided with the usual pressure indicating gauge 6, the shank 7 of which is threaded into an opening provided in the cover for communication with the interior of the cooker.

The cover 4 is also provided with a conventional pressure regulating valve 8, detachably mounted on a connector fitting 9 threaded into an opening 10 provided in the cover 4. The structure of the regulating valve 8 and the connector fitting 9 are illustrated in detail in Fig. 2.

The fitting 9 comprises a stem 11 threaded at its upper and lower ends, and provided with an intermediate tool receiving flange 12. The lower end of the stem is provided with a restricted opening 13 which forms a seat 14 for reception of a ball valve 15, loosely mounted within a head 16 carried by a valve stem 17.

Normally threaded upon the upper end of the stem 11 is a thimble 18 through which the valve stem extends and is provided on its outer end with a pivotally connected lever 19, which, in released position as shown in the drawing, permits the ball valve 15 to seat and close the opening 13. A spring 20 surrounding the valve stem 17 and disposed between the head 16 and top of the thimble 18 serves to normally urge the valve toward its seat. When it is desired to open the valve the lever 19 is swung to longitudinal alinement with the stem, which shifts the head 16 and ball valve 15 away from its seat against the tension of the spring 20. Openings 21 provided in the thimble 18 then allows free escape of pressure fluid through the fitting 9.

The testing apparatus per se consists of a coupling designated generally as C, and comprising a body 22 provided with a longitudinal passage 23, the opposite ends of which are internally threaded. Mounted on a stem 24 threaded into the top of the body 22 is a master indicator gauge 25 of any conventional type, the face of which is provided with suitable graduations for indicating pressure, and if desired corresponding temperatures. To insure accuracy of the master gauge, the pointer 26 may be manually set at atmospheric pressure by the regulating screw 27.

Threaded into the lower end of the body 22 is a nipple 28 having a spud 29 formed on its lower end for seating into the upper end of the stem 11. A swivel nut 30 mounted on the nipple 28 engages a peripheral flange 31 formed on the lower end of the nipple to securely lock it on the stem by turning the nut down on the threaded end.

The swivel nut 30 is provided with one or more radial openings 30', to permit the gradual escape of pressure within the receptacle should the operator inadvertently attempt to remove the testing apparatus without first releasing the regulating valve 8 or the cover 4.

Also, attached to the body 22 is an adapter fitting 32, which is identical in structure and dimensions to the connector fitting 9. Consequently, during the testing operation the regulating valve 8 after removal from the fitting 9 is positioned on the adapter 32 to function in the same manner as when applied to the fitting 9 during normal cooking operation.

From the foregoing, considered in connection with the accompanying drawing, operation of the cooker and testing apparatus will be apparent. Normally the pressure regulating valve is adjusted on the connector fitting 9 to regulate the tension of the spring 20, and allow release of the pressure generated in the cooker at a predetermined degree. The gauge 6 serves its inherent purpose, namely to indicate the amount of pressure, and consequently the temperature developed within the cooker. The valve 8 is set or adjusted by the operator to maintain the desired pressure when reached as indicated by the pressure gauge, which then makes it easy for the operator to properly time the cooking operation.

When it is desired to check or test the gauge 6 it is merely necessary to remove the valve 8 from the fitting 9 and attach the coupling C by means of the swivel nut 30. The removed valve 8 is then threaded on the adapter fitting 32, in which position it serves solely as a safety device to prevent the development of excessive pressure during testing, either from carelessness or ignorance of the operator.

Assuming that moisture or liquid has been supplied to the cooker, the cover is clamped down and heat is applied to the receptacle to create steam pressure within the cooker. Such pressure is then checked on both the gauge 6 and the master gauge 25 and compared to determine the accuracy of the gauge 6. In the event that the latter is found to be inaccurate, the operator then can note the extent of the inaccuracy and in future operation of the cooker make allowance for the same in determining the proper pressure for timing the cooking operation.

It will be obvious from the foregoing that an exceedingly simple method and economical and fool-proof testing apparatus has been provided which will enable an unskilled operator to quickly check and determine any inaccuracies in the conventional cooker gauge, thus saving the expense and time of returning the gauge to the factory, and avoiding the possibility of leakage through disturbance of the factory connection between the gauge and cooker, which frequently results in leakage.

In a few instances, it has been noted that some domestic cookers are equipped with pressure regulating valves which are not separable, as the valve 8 illustrated, and consequently the entire valve must be removed from the cooker cover to allow attachment of the present testing apparatus. To meet such conditions, a separate adapter fitting corresponding to the connector fitting 9 is provided, and the testing apparatus is equipped with any type of pressure regulating valve to serve the purpose of the valve 8 in testing, thus making it unnecessary to use the valve removed from the cooker.

It is true that the foregoing condition will require disturbing the connection between the regulating valve and cooker, but that is not as serious as disturbing the connection between the pressure gauge and cooker, which is still avoided by the present method and apparatus.

Therefore the invention contemplates broadly a method and apparatus, in which the conventional regulating valve is replaced by a testing gauge equipped with a regulating valve, whether it be the valve of the cooker or another valve.

I claim:

An apparatus for testing a pressure indicator gauge on a pressure cooker without removing the same from the cooker comprising a coupling for attachment to a valve connector fitting provided on said pressure cooker independent of the cooker gauge, a master pressure indicator gauge carried by said coupling, and an adapter fitting attached to said coupling for receiving the valve removed from said connector fitting to which said coupling is to be attached, said coupling being provided with an orifice to release pressure within the cooker upon initial loosening of said coupling.

WM. ECK.

REFERENCES CITED

The following references are of record in the file of this patent:

UNITED STATES PATENTS

| Number | Name | Date |
| --- | --- | --- |
| 1,200,432 | Swan | Oct. 3, 1916 |
| 2,207,898 | Schoenecke | July 16, 1940 |

FOREIGN PATENTS

| Number | Country | Date |
| --- | --- | --- |
| 1,206 | Great Britain | Jan. 22, 1891 |